ന്ധ്യസ്

US005603881A

United States Patent [19]

Hanna

[11] Patent Number: 5,603,881
[45] Date of Patent: Feb. 18, 1997

[54] ALKALI METAL SALTS AS SURFACE TREATMENTS FOR FIBERBOARD

[75] Inventor: Timothy D. Hanna, Willits, Calif.

[73] Assignee: Masonite Corporation, Chicago, Ill.

[21] Appl. No.: 359,020

[22] Filed: Dec. 19, 1994

Related U.S. Application Data

[63] Continuation of Ser. No. 83,087, Jun. 25, 1993, abandoned.

[51] Int. Cl.⁶ ........................................ B29C 43/22
[52] U.S. Cl. ........................... 264/123; 264/338; 156/62.2
[58] Field of Search ........................... 264/109, 123, 264/338; 156/62.2

[56] References Cited

U.S. PATENT DOCUMENTS

| | | | |
|---|---|---|---|
| 2,046,750 | 7/1936 | Mason et al. | 92/61 |
| 2,571,986 | 10/1951 | Hallonquist | 18/47.5 |
| 2,599,092 | 6/1952 | Craig | 92/3 |
| 2,653,883 | 9/1953 | Thomas | 134/30 |
| 2,744,013 | 5/1956 | Dorland et al. | 92/21 |
| 2,775,170 | 12/1956 | Bustin et al. | 92/61 |
| 2,796,367 | 6/1957 | Brown | 134/6 |
| 2,843,509 | 7/1958 | Arden | 134/39 |
| 2,992,995 | 7/1961 | Arden | 252/152 |
| 3,305,499 | 2/1967 | Bevans | 260/17.3 |
| 3,549,485 | 12/1970 | Eckert | 162/152 |
| 3,617,427 | 11/1971 | LeBlanc | 161/133 |
| 3,927,235 | 12/1975 | Chow | 428/302 |
| 3,981,950 | 9/1976 | Pletzer et al. | 264/109 |
| 4,022,639 | 5/1977 | Ueki | 134/2 |
| 4,060,580 | 11/1977 | Pampel | 264/109 |
| 4,082,904 | 4/1978 | Bornstein | 428/528 |
| 4,110,397 | 8/1978 | Wooler | 264/109 |
| 4,175,148 | 11/1979 | Luck et al. | 428/171 |
| 4,228,202 | 10/1980 | Tjännberg | 427/212 |
| 4,238,438 | 12/1980 | Laughinghouse et al. | 264/119 |
| 4,283,450 | 8/1981 | Luck et al. | 428/171 |
| 4,305,989 | 12/1981 | Luck et al. | 428/171 |
| 4,379,808 | 4/1983 | Cole et al. | 428/438 |
| 4,411,738 | 10/1983 | Wittrup et al. | 162/142 |
| 4,423,173 | 12/1983 | Janiga | 524/14 |
| 4,479,912 | 10/1984 | Bullock | 264/23 |
| 4,514,255 | 4/1985 | Maxwell et al. | 162/9 |
| 4,514,532 | 4/1985 | Hsu et al. | 524/14 |
| 4,517,240 | 5/1985 | Tracton et al. | 428/326 |
| 4,565,662 | 1/1986 | Mansson et al. | 264/109 |
| 4,692,292 | 9/1987 | Kollmeier et al. | 264/338 |
| 4,734,231 | 3/1988 | Morita et al. | 264/45.3 |
| 4,850,849 | 7/1989 | Hsu | 264/109 |
| 4,879,083 | 11/1989 | Knudson et al. | 264/122 |
| 4,882,112 | 11/1989 | Maki et al. | 264/109 |
| 4,915,766 | 4/1990 | Baxter | 156/335 |
| 4,933,015 | 6/1990 | White | 134/6 |
| 4,935,457 | 6/1990 | Metzner et al. | 524/14 |
| 4,944,823 | 7/1990 | Stofko | 156/283 |
| 5,030,292 | 7/1991 | Koike et al. | 134/32 |
| 5,055,247 | 10/1991 | Ueda et al. | 264/109 |
| 5,057,167 | 10/1991 | Gersbeck | 264/109 |
| 5,064,592 | 11/1991 | Ueda et al. | 264/112 |
| 5,093,051 | 3/1992 | Reiniger | 264/109 |
| 5,134,023 | 7/1992 | Hsu | 264/109 |
| 5,158,012 | 10/1992 | Gawlitta et al. | 264/109 |
| 5,246,652 | 9/1993 | Hsu et al. | 264/109 |
| 5,262,006 | 11/1993 | Andersson et al. | 162/147 |

FOREIGN PATENT DOCUMENTS

| | | | |
|---|---|---|---|
| 2158653 | 11/1979 | Germany | 264/109 |
| 56-159148 | 12/1981 | Japan | 264/109 |
| 3164201 | 7/1991 | Japan | 264/109 |
| 1516357 | 10/1989 | U.S.S.R. | 264/109 |
| 2025989 | 1/1980 | United Kingdom | 264/109 |

OTHER PUBLICATIONS

Kirk–Othmer, Encyclopedia of Chemical Technology, Second Edition 1970, vol. 21, pp. 601–620.
Kirk–Othmer, Encyclopedia of Chemical Technology, Fourth Edition 1995, vol. 14, pp. 902–915.
A. Pizzi, Wood Adhesives, Chemistry and Technology, 1989, vol. 2, pp. 78–81.
Norman Allinger et al., Organic Chemistry, Second Edition 1976, p. 553.
Material Safety Data Sheet, Eastman Kodak Company, New York, Nov. 11, 1986.
Hawley's Condensed Chemical Dictionary, Twelfth Edition 1993, p. 430.
J. R. Robertson, et al., "Adhesives Based On Emulsifiable MDI Isocyanates," Rubicon Chemicals Inc. pp. 1–11.

*Primary Examiner*—Allan R. Kuhns
*Attorney, Agent, or Firm*—Marshall, O'Toole, Gerstein, Murray & Borun

[57] ABSTRACT

A process for the production of a wood composite, such as fiberboard, having improved surface characteristics includes the application of an alkali metal salt, e.g. an alkali metal carbonate. The process also reduces the amount and integrity of carbon film that generally forms in the die during consolidation, making the die significantly easier to clean.

28 Claims, No Drawings

ALKALI METAL SALTS AS SURFACE TREATMENTS FOR FIBERBOARD

This is a continuation of U.S. application Ser. No. 08/083,087, filed Jun. 25, 1993, now abandoned.

BACKGROUND OF THE INVENTION

1. Field of the Invention

The invention relates generally to the production of a wood composite having superior surface quality. The invention also relates to a process for the production of a wood composite which overcomes the disadvantages of known solution treatments. More particularly, the invention relates to the minimization of the amount and integrity of undesirable materials which tend to build up on die surfaces utilized during consolidation of the wood composite.

2. Brief Description of Related Technology

Wood composites, e.g. hardboard or fiberboard, may be formed in desired shapes and sizes depending on the intended use, for example as a doorfacing or doorskin which is applied to a door body. The principal processes for the manufacture of wood composites include (a) wet felted/wet pressed or "wet" processes, (b) dry felted/dry pressed or "dry" processes, and (c) wet felted/dry pressed or "wet-dry" processes.

Generally in a wet process, cellulosic fillers or fibers (e.g. woody material which is subjected to fiberization to form wood fibers) are blended in a vessel with large amounts of water to form a slurry. The slurry is deposited along with a synthetic resin binder, such as a phenol-formaldehyde resin, onto a water-pervious support member, such as a fine screen or a Fourdrinier wire, where much of the water is removed to leave a wet mat of cellulosic material having, for example, a moisture content of about fifty weight percent. Where two separate water removal steps are utilized, these steps may be referred to as the primary water removal step and the secondary water removal step. The wet mat is transferred from the pervious support member to a press and consolidated under heat and pressure to form the molded wood composite.

In a dry process, the cellulosic fibers are generally conveyed in a gaseous stream (or by mechanical means) rather than a liquid stream. For example, the cellulosic fibers may be first coated with a thermosetting resin binder, such as a phenol-formaldehyde resin, and are then randomly distributed into a mat by air blowing the resin-coated fibers onto a support member. The mat, typically having a moisture content of less than 30 wt. % and preferably less than 10 wt. %, is then pressed under heat and pressure to cure the thermosetting resin and to compress the mat into an integral consolidated structure.

A wet-dry forming process may also be used to produce wood composites. Generally, in a wet-dry process, a slurry is formed of water, a cellulosic filler, and a resin binder. Sufficient water is then drained from the slurry to form a wet mat. Further water is then removed from the wet mat by evaporation, which is preferably facilitated by the application of heat, in order to form a dried mat. The dried mat is then pressed under heat to form the wood composite.

Preferably, a wet-dry process begins by blending cellulosic or wood fiber raw material in a vessel with large amounts of water having a pH of less than 7 to form a slurry. This slurry is then blended with the resin binder. The blend is then deposited onto a water-pervious support member, where a large percentage (e.g. 50%) of the water is removed, thereby leaving a wet mat of cellulosic material. Further water may be removed in a second step, in which case these two steps may be referred to respectively as the primary water removal step and the secondary water removal step. This wet mat is then transferred to an evaporation zone where much of the remaining water is removed by evaporation, for example by heating the wet mat. The mat may be further dried in a second evaporation step, in which case these two evaporation steps may be referred to respectively as the primary evaporation step and the secondary evaporation step. (These steps are commonly referred to as "drying" steps.) The dried mat preferably has a moisture content of less than about 10 wt. %. The dried mat is then transferred to a press and consolidated under heat and pressure to form the wood composite which may be, for example, a flat board or in any desired shape depending on its intended use.

Wood composites produced according to the processes described above may, however, have poor surface quality. Poor surface quality is indicated by a wood composite having a porous or open surface, inadequate consolidation along the edges or corners of the wood composite and/or poor definition of wood grain which is often embossed on the surface of the wood composite. Poor surface quality is also indicated where the wood composite exhibits poor internal bonding and strength, especially at the edges of the wood composite. For example, poor surface quality is shown where there appears to be layers within the composite which are "flaky" and can be easily peeled away; this phenomenon may be referred to as a lack of surface tightness. Where there is poor surface quality, the wood composite may easily break apart and the product is therefore unsatisfactory.

In order to help prevent the problems associated with poor surface quality, a urea solution has been used as a surface treatment. The urea converts to ammonia under heat, which then plasticizes the fibers during consolidation. However, the use of urea has several disadvantages, including the relatively high application rate which is required (up to two grams of urea solids per square foot), contribution to the build up of undesirable material (e.g., a film which includes carbon and other materials, commonly referred to as a "carbon film") on the die surfaces, promotion of corrosion on unplated die surfaces, and the addition of ammonia to the press exhaust stream. The carbon film may damage the final product and/or the die surfaces and is difficult to remove from the die surfaces. The presence of ammonia in the exhaust gases is of particular concern if thermal oxidation is used as a pollution control measure, because the ammonia can convert to oxides of nitrogen ($NO_x$), which are hazardous. It is therefore desirable to reduce or eliminate the need for a urea treatment during pressing of the wood product.

The surface of the wood composite may also be improved by postpress tempering with drying oils. Many different types of tempering oils may be used, including linseed oil, soybean oil, tung oil, oiticica oil, and unsaturated fatty acid esters. However, the use of these oils increases both cost and production time. In addition, use of such oils may be environmentally undesirable. It is therefore desirable to reduce or eliminate the need for such postpress treatment of the molded wood product.

SUMMARY OF THE INVENTION

It is an object of the invention to overcome one or more of the problems described above.

Accordingly, the invention provides a process for producing a wood composite which has superior surface quality. The invention further provides a method for reducing the degree and integrity of buildup of undesirable materials in the die used to consolidate a mat to form the wood composite.

In general, the invention is carried out by providing an alkali metal salt (e.g., a carbonate salt such as sodium carbonate) on at least one surface of a mat of cellulosic fibers. The treatment is performed prior to consolidating the mat under heat and pressure in a die. The inventive process preferably obviates the need for further treatment, e.g. urea treatments or tempering with oils, to provide a wood composite with high surface quality. The inventive process also facilitates cleaning of the dies used for pressing of the wood composite.

Further objects and advantages of the invention will be apparent to those skilled in the art from the following detailed description, taken in conjunction with the appended claims.

DETAILED DESCRIPTION OF THE INVENTION

According to the invention, a treatment is provided which will preferably (a) improve the surface characteristics of the wood composite and/or (b) reduce the amount and integrity of undesirable materials (including a carbon film) which tend to build up on die surfaces during pressing of the wood composite.

The inventive treatment includes providing an alkali metal salt (e.g., a carbonate salt such as sodium carbonate) on at least one surface of a mat of cellulosic fibers. The treatment is performed prior to consolidation of the mat under heat and pressure.

The treatment preferably has a beneficial effect on board consolidation in the hot press. The outer layers of board which are subjected to the inventive treatment preferably are better consolidated than board made with the urea-based surface treatment. As a result, the need for further treatment generally necessary to improve the surface quality of the wood composite is preferably reduced or obviated. For example, the quantity of post-press applied tempering oil required to bind the outer layers of molded door facings is preferably significantly reduced.

The inventive treatment is preferably employed on the face of the mat, where it is able to improve the surface quality of the wood composite, e.g. surface tightness, embossed grain fidelity, and integrity of the molded edges, as described above. However, the treatment may also be applied to the face and the back of the mat in order to improve the back side consolidation and integrity in the hot press, even though grain definition is not an issue on the back side of the wood composite. Such a double-sided treatment, in conjunction with other process changes, may enable the reduction of tempering oil application, for example by approximately 20%.

The treatment preferably affects both the rate of accumulation of carbon film and the nature of the carbon film that does build up. The film that develops has significantly less integrity, and thus is easier to remove from the dies. This allows for simplification of the die cleaning procedure. Where the inventive treatment is utilized, it may be feasible to clean the dies while they are still in the press, rather than removing the dies from the press for chemical cleaning as has generally been necessary. The cleaning of the dies in the press after the inventive treatment may be by mechanical and/or chemical means.

The inventive treatment preferably provides similar surface quality to urea treatment (described above), however at much lower application rates. Still further, there is an elimination of ammonia from the press exhaust.

As stated above, the inventive treatment preferably includes the application of an alkali metal salt, for example an alkali metal carbonate. Most preferably, the inventive treatment includes the application of an aqueous solution of a carbonate salt. Examples of useful salts include sodium carbonate, potassium carbonate, and magnesium carbonate. It should be understood, however, that although this detailed description may refer to sodium carbonate, the use of any alkali salt such as those described above (including the equivalents thereof) is contemplated by the invention.

In addition, the inventive treatment may include one or more press release agents which help ensure that the pressed wood composite readily releases from the press surface (e.g. a plate or die) when the press is opened at the end of the press cycle. Many useful press release agents are known in the art, and include wax-based materials, silicones, various polymers (natural, or synthetic fluorocarbons and hydrocarbons), Dow Corning 290 silicone emulsion (a paintable grade silicone emulsion manufactured by Dow Corning of Midland, Michigan) and other commonly used press release agents. Glidden FIBERTITE®I pre-press sealer (manufactured by Lilly Industries, Inc. of Indianapolis, Ind.) is a preferred press release agent. However, the use of a press release agent is completely optional and is not necessary to obtain the benefits of the invention.

Press release agents facilitate easy removal of the wood composite from the press and reduce defects from loose or pulled fibers. Further, a press release agent, such as FIBERTITE®I sealer, preferably decreases the propensity for water staining from the soluble byproducts produced by the reaction between the wood fibers and sodium carbonate. The press release agents are usually supplied as water dilutable emulsions. For example, the press release agent may be blended with a 7 wt. % solution of sodium carbonate. Water is then added to the mixture to dilute the sodium carbonate to the desired concentration for application to the fiber mat, as further described herein.

Blending of the inventive surface treatment and press release agent is preferably done as a matter of convenience so that both compositions may be applied to the mat in a single application. However, the press release agent may alternatively be applied separately from the inventive surface treatment.

The press release agent may be applied to wet or dry mats in different manners which are known in the art, depending on the process that is selected to form the wood composite. For example, the press release agent may be applied by spraying, roll coating or a flood and squeegee method. The press release agent may be applied at one of many different steps in the process; for example, in a wet-dry process, the press release agent may be applied before primary drying, between the primary and secondary drying steps, or immediately before consolidation under heat and pressure.

Although the inventive treatment is not limited to a particular application rate, the inventive treatment preferably comprises the application of sodium carbonate at a rate in the range of 0.05–0.75 dry grams (i.e., an amount measured before dissolving the sodium carbonate in water) per square foot of mat in order to provide sufficient effectiveness but at the same time avoiding degradation of the board surface quality. More preferably, an application rate of 0.05–0.3 grams per square foot, and most preferably an application rate of 0.1–0.2 grams per square foot, of mat is utilized. However, this rate of application is variable and may be adjusted depending on the specific manufacturing parameters. If an aqueous solution of sodium carbonate is utilized, the ratio of dry sodium carbonate to water should be selected to maintain a satisfactory level of water application to the fiber mat. The depth of penetration of the sodium carbonate solution into the fiber mat, and thus the effect of the treatment, can be altered by changing the ratio of sodium carbonate to water. A preferred solution has the following composition: about 0.75 wt. % to about 1.50 wt. % sodium carbonate, about 2.25 wt. % to about 3.0 wt. % of a press release agent, and the balance substantially water.

An example of the inventive treatment will now be described in conjunction with the manufacture of a fiberboard by a wet-dry process. It should be understood, however, that the inventive treatment is applicable to any of the "wet," "dry," and "wet-dry" processes which are identified and described above. The resulting fiberboard may be in the form of a doorfacing or doorskin which is then applied to a door body to make a final product of a door.

Process water is preferably first incorporated with a binder resin, e.g. a phenol-formaldehyde resin. Numerous binder resins are suitable, and include those resins disclosed in U.S. Pat. No. 4,514,532 to Hsu et al., which has the same assignee as the present application. This disclosure is incorporated herein by reference.

A slurry is then formed of the mixture of the process water and binder resin and cellulosic particles which have been fiberized and prepared according to any known method to form wood fibers. The order in which these ingredients are mixed is not essential; the ingredients may be incorporated in any order, for example by first combining the process water and wood fibers, followed by adding the binder resin. The mixture is placed on a water-pervious screen which removes excess water from the mixture by draining, thereby forming a wet mat. After this primary water removal step, the mat is optionally subjected to a secondary water removal step, which may use mechanical means to remove further water.

The wet mat is next transported to a drying zone, where the moisture content is still further reduced, as by heating. This drying is optionally performed in two steps, as stated above. As the mat leaves the drying zone as a dried mat, the moisture content is preferably in the range of about 5 to about 10 weight percent.

Subsequent to drying, a solution of sodium carbonate ($Na_2CO_3$), such as that described above, is placed on the surface of the dried mat. There is preferably selected an aqueous solution of about 1.25 wt. % sodium carbonate and about 2.67 wt. % FIBERTITE®I release agent, with the balance being substantially water. The exemplary solution is preferably applied at a rate of about 11 to about 13, and more preferably about 12, wet grams per square foot of the dried mat. Based on this formulation, approximately 11 to 12, e.g. 11.83 ml, of the solution are applied per square foot of surface area of the dried mat.

The inventive treatment is preferably applied to all surfaces of the mat; however, the exposed surfaces of the final product (i.e., those surfaces which will be viewable in the final product) are the most crucial as these will be seen in the final use of the fiberboard. The drying need not be performed prior to the application of the inventive treatment, and the solution may be applied to the mat at numerous points in the process. For example, in either of the wet felted processes, such as those described above (i.e., a "wet" process or "wet-dry" process), the inventive treatment may be applied prior to or during the primary water removal stage. In such a wet felted process, the inventive treatment may also be applied after the secondary water removal stage. In a wet felted/dry pressed process (i.e., a "wet-dry" process), the inventive treatment may alternatively be applied after any drying step, (e.g., if there are two drying steps the inventive treatment may be applied after either the primary drying step or after the secondary drying step). In a dry felted/dry pressed process (i.e., a "dry" process) the inventive treatment is preferably applied at any time prior to consolidation.

In the case of a wet felted process, the inventive treatment is preferably applied by spraying the fiberboard mat with an airless spray nozzle. However, any suitable technique may be used to provide the inventive treatment (e.g., in the form of an aqueous solution) on the surface of either the wet or dried mat. For example, the solution may also be applied by roll coating or a flood and squeegee method. Where the inventive treatment is applied prior to or during the primary water removal step in a wet felted process, it might be desirable to utilize a weir or headbox to deliver the solution. In a dry process, the inventive treatment may be provided onto a formed mat in the form of aqueous solution. Alternatively, dry sodium carbonate may be provided during the dry felting process, for example, by impregnating the wood fibers with a granular form of the inventive treatment.

After the application of the inventive treatment, the dried mat is placed in a press where the mat is consolidated under heat and pressure to produce a wood composite. (However, if desired, the mat may be placed in the press prior to application of the inventive treatment.) The pressing temperature is variable depending upon the materials and process selected. However, the pressing temperature is preferably greater than 400° F., and most preferably in the range of about 430° F. to about 450° F. During consolidation it is desirable to cause plasticization of the fibers. Plasticized fibers more readily conform to the contours of the die, resulting in better moldability. Also, when the fibers are plasticized, corners or other areas where the angle of the die changes abruptly are less likely to develop a pulling apart of the fibers (sometimes referred to as "haystacking"). Further, the definition of a wood grain pattern embossed on the face of the wood composite is enhanced by plasticization of the surface fibers.

After the wood composite has been pressed, it may be immediately transported for coating, gluing, or other finishing to complete a desired product for commercial use. Because the wood composite preferably has superior surface quality, including complete consolidation of the mat along its edges and corners, without any further treatment, the need for tempering the product with oils is preferably either greatly reduced or eliminated. Further, the inventive treatment does not require the use of pre-press sealers generally utilized to improve the surface quality of the wood composite.

The inventive treatment preferably prevents or significantly reduces the generation of oxides of nitrogen ($NO_x$) when thermal oxidation is used as a pollution control measure for press emissions, a disadvantage generally encountered when using urea-based treatments, as described above.

Also, as a result of the inventive treatment, the amount of carbon film which generally forms or develops during consolidation in the press is preferably reduced. Further, the film that does form preferably has significantly less integrity. As a result, the film is easier to remove from the dies.

The foregoing description is given for clearness of understanding only, and no unnecessary limitations should be understood therefrom, as modifications within the scope of the invention will be apparent to those skilled in the art.

I claim:

1. A method for the preparation of a wood composite by a dry process, comprising the steps of:
   (a) combining a cellulosic filler and a binder resin to form a mat having a face surface and a back surface and a moisture content of less than about 30 weight percent;
   (b) consolidating said mat under heat and pressure, said mat having a moisture content of less than about 30 weight percent at the beginning of the heat and pressure consolidation step; and
   (c) providing, on at least one substantially entire face surface or back surface of said mat, an alkali metal carbonate salt prior to step (b).

2. The method of claim 1, further comprising:
providing, on at least one face or back surface of said mat, a press release agent prior to step (b).

3. The method of claim 1 wherein:
step (c) comprises providing a treatment consisting essentially of an alkali metal carbonate.

4. The method of claim 1 wherein:
said alkali metal salt comprises a solution of sodium carbonate.

5. The method of claim 4 wherein:
said solution further comprises a press release agent.

6. The method of claim 5 wherein:
said solution comprises about 0.75 to about 1.50 wt. % sodium carbonate and about 2.25 to about 3.0 wt. % of a press release agent.

7. The method of claim 5 wherein:
step (c) comprises applying said solution in a quantity of about 11 to about 12 milliliters per square foot of at least one substantially entire face or back surface of said mat.

8. The method of claim 5 wherein:
step (c) comprises applying said solution in a quantity of about 11 to about 13 grams, on a wet weight basis, of said sodium carbonate and said press release agent per square foot of at least one substantially entire face or back surface of said mat.

9. The method of claim 1 wherein:
said alkali metal salt comprises a solution of sodium carbonate; and
step (c) comprises applying said solution in a quantity of about 0.05 to about 0.75 grams, on a dry weight basis, of sodium carbonate per square foot of at least one substantially entire face or back surface of said mat.

10. The method of claim 1, further comprising:
providing, on at least one substantially entire face or back surface of said mat, a press release agent.

11. The method of claim 1 wherein:
step (c) comprises providing said alkali metal salt to both the face surface and back surface of said mat.

12. The method of claim 1 wherein:
step (b) comprises consolidating said mat in a press having pressing surfaces; and
said step (c) comprises providing said alkali metal salt to substantially all surfaces of said mat in contact with said pressing surfaces.

13. The method of claim 1 wherein:
step (d) comprises consolidating the product of step (c) at a temperature greater than 400° F.

14. The method of claim 1 wherein:
step (d) comprises consolidating the product of step (c) at a temperature in the range of about 430° F. to about 450° F.

15. A method for the preparation of a wood composite by a dry process, comprising the steps of:
   (a) mixing a cellulosic filler with a binder resin;
   (b) forming a mat of the product from step (a) having a moisture content of less than about 30 wt. %;
   (c) providing on at least one substantially entire face surface or back surface of said mat, a solution comprising an alkali metal carbonate salt; and
   (d) consolidating the product of step (c) under heat and pressure, said mat having a moisture content of less than about 30 weight percent at the beginning of the heat and pressure consolidation step.

16. A method for the preparation of a wood composite, comprising the steps of:
   (a) forming a slurry comprising water, a cellulosic filler and a binder resin;
   (b) removing sufficient water from the product of step (a) to form a mat having a face surface and a back surface and a moisture content of less than about 30 weight percent;
   (c) consolidating said mat under heat and pressure, said mat having a moisture content of less than about 30 weight percent at the beginning of the heat and pressure consolidation step; and
   (d) providing, on at least one substantially entire face surface or back surface of said wet mat, a solution comprising an alkali metal carbonate salt prior to step (c).

17. The method of claim 16 wherein:
step (b) comprises (i) draining sufficient water from the product of step (a) to form a wet mat and (ii) removing water from said wet mat by evaporation to form said mat having a moisture content of less than about 30 weight percent.

18. The method of claim 17 wherein:
step (d) comprises providing said solution on at least one substantially entire surface of the product of step (a) prior to step (ii).

19. The method of claim 17 wherein:
step (ii) comprises a primary drying step and a secondary drying step.

20. The method of claim 19 wherein:
step (d) comprises providing said solution on at least one substantially entire face or back surface of the product of said primary drying step.

21. The method of claim 19 wherein:
step (d) comprises providing said solution on at least one substantially entire face or back surface of the product of said secondary drying step.

22. In a method for consolidating a mat having a face surface and a back surface in a die, said mat having a moisture content of less than about 30 weight percent at the beginning of a consolidation step to produce a wood composite, the improvement comprising the step of:
providing, on at least one substantially entire face surface or back surface of said mat, a solution comprising an alkali metal carbonate salt prior to consolidation whereby the effect of carbon buildup on die surfaces is reduced.

23. In a method as recited in claim 22, the procedure wherein:

said solution comprises sodium carbonate.

24. In a method for consolidating a mat by a dry process, having a moisture content of less than about 30 weight percent in a die to produce a wood composite, a procedure for improving the surface quality of the products, said procedure comprising the step of:

providing, on at least one face surface or back surface of said mat, a solution comprising an alkali metal carbonate salt prior to consolidation and consolidating said mat under heat and pressure, said mat having a moisture content of less than about 30 weight percent at the beginning of the heat and pressure consolidation step.

25. In a method as recited in claim 24, the procedure wherein:

said solution consists essentially of sodium carbonate.

26. In a method as recited in claim 24, the procedure wherein:

said solution further comprises a press release agent.

27. A method for the preparation of a wood composite, comprising the steps of:

(a) mixing a cellulosic filler with a binder resin;

(b) forming a mat of the product from step (a) by a dry process, having a moisture content of less than about 30 wt. %;

(c) consolidating said mat under heat and pressure, said mat having a moisture content of less than about 30 weight percent at the beginning of the heat and pressure consolidation step; and (d) providing an alkali metal carbonate salt to said cellulosic filler prior to step (b).

28. A method for the preparation of a wood composite, comprising the steps of:

(a) forming a slurry comprising water, a cellulosic filler and a binder resin;

(b) removing water from said slurry;

(c) forming a mat having a moisture content of less than about 30 weight percent from the product of step (b);

(d) consolidating said mat under heat and pressure, said mat having a moisture content of less than about 30 weight percent at the beginning of the heat and pressure consolidation step; and (e) providing to said slurry a solution comprising an alkali metal carbonate salt prior to step (c).

* * * * *